United States Patent [19]

Spokas

[11] 4,238,017
[45] Dec. 9, 1980

[54] CLUTCH MECHANISM

[75] Inventor: Romas B. Spokas, Rockford, Ill.

[73] Assignee: Borg-Warner Corporation, Chicago, Ill.

[21] Appl. No.: 857,550

[22] Filed: Dec. 5, 1977

[51] Int. Cl.³ .......................................... F16D 43/25
[52] U.S. Cl. .............................. 192/82 T; 192/85 CA; 192/91 A
[58] Field of Search ............. 192/85 CA, 82 T, 85 A, 192/91 A, 88 A

[56] References Cited

U.S. PATENT DOCUMENTS

| 1,300,898 | 5/1919 | Vincent | 192/85 A |
| 2,414,359 | 1/1947 | Carnagva | 192/85 A |
| 3,804,219 | 4/1974 | Cummings | 192/85 CA |
| 3,848,622 | 11/1974 | Cummings | 192/82 T |
| 4,094,393 | 6/1978 | Spokas | 192/85 CA |

FOREIGN PATENT DOCUMENTS 47860  7/1965  Japan ........................... 192/85 A Primary Examiner—George H. Krizmanich
Attorney, Agent, or Firm—Robert L. Zieg

[57] ABSTRACT

A temperature responsive drive mechanism for an engine accessory adapted to be connected to the oil pressure supply line for an engine and including a fluid circuit which is temperature responsive and requires only two fluid passages to provide for lubrication of the device, return of fluid to the oil sump, and the actuating pressure supply for the clutch mechanism included in the device. A rotatable driven housing is provided including therein a rotatable driving clutch drum and a non-rotating actuator mechanism adapted to move the drum into engagement with a complimentary surface on the interior of the housing.

8 Claims, 10 Drawing Figures

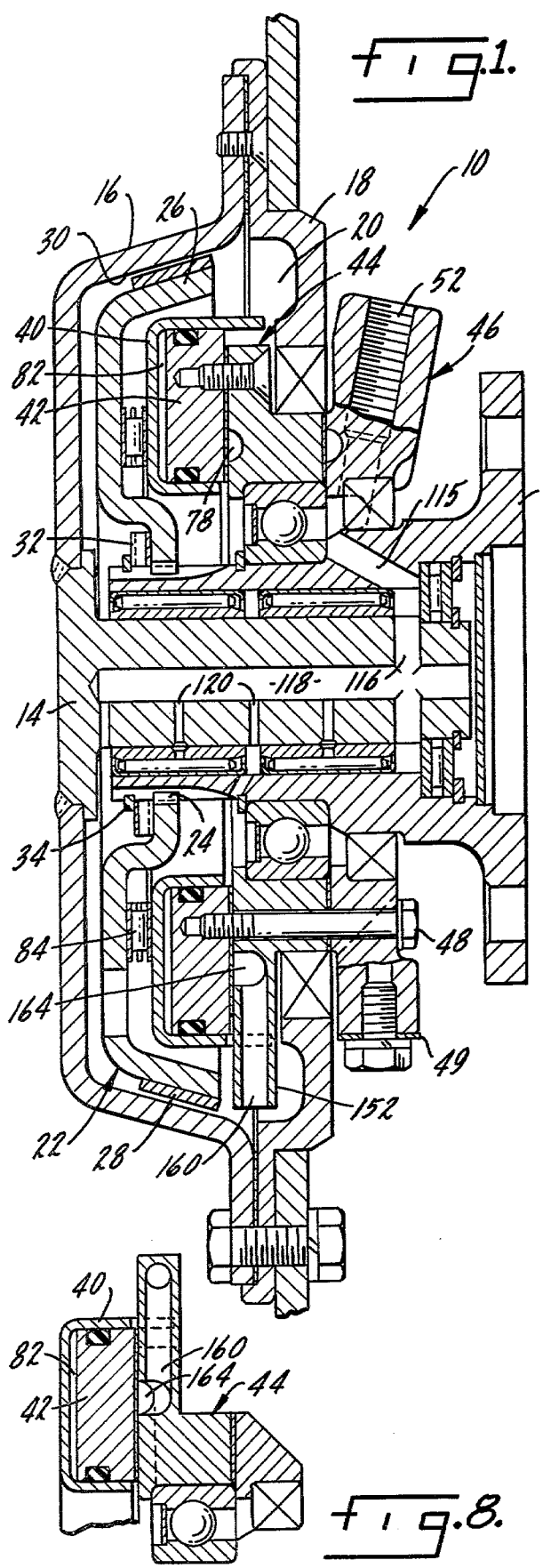

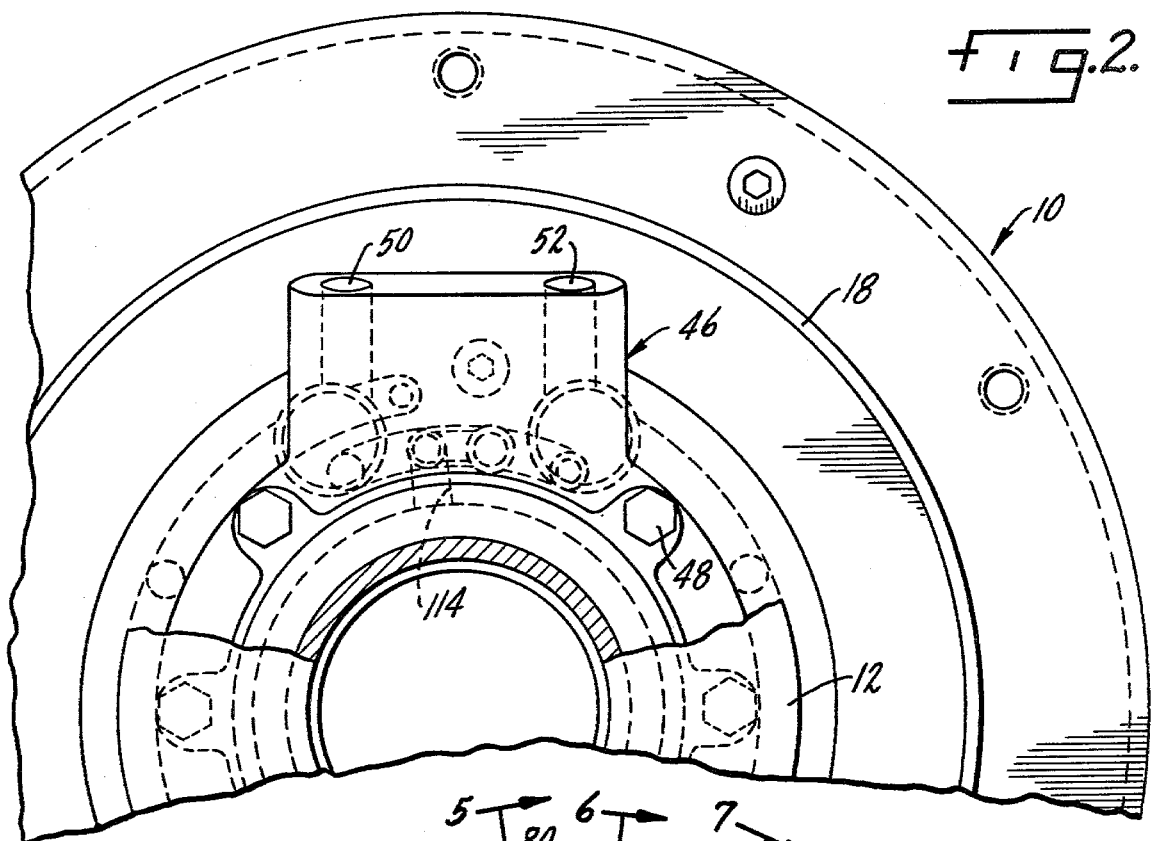
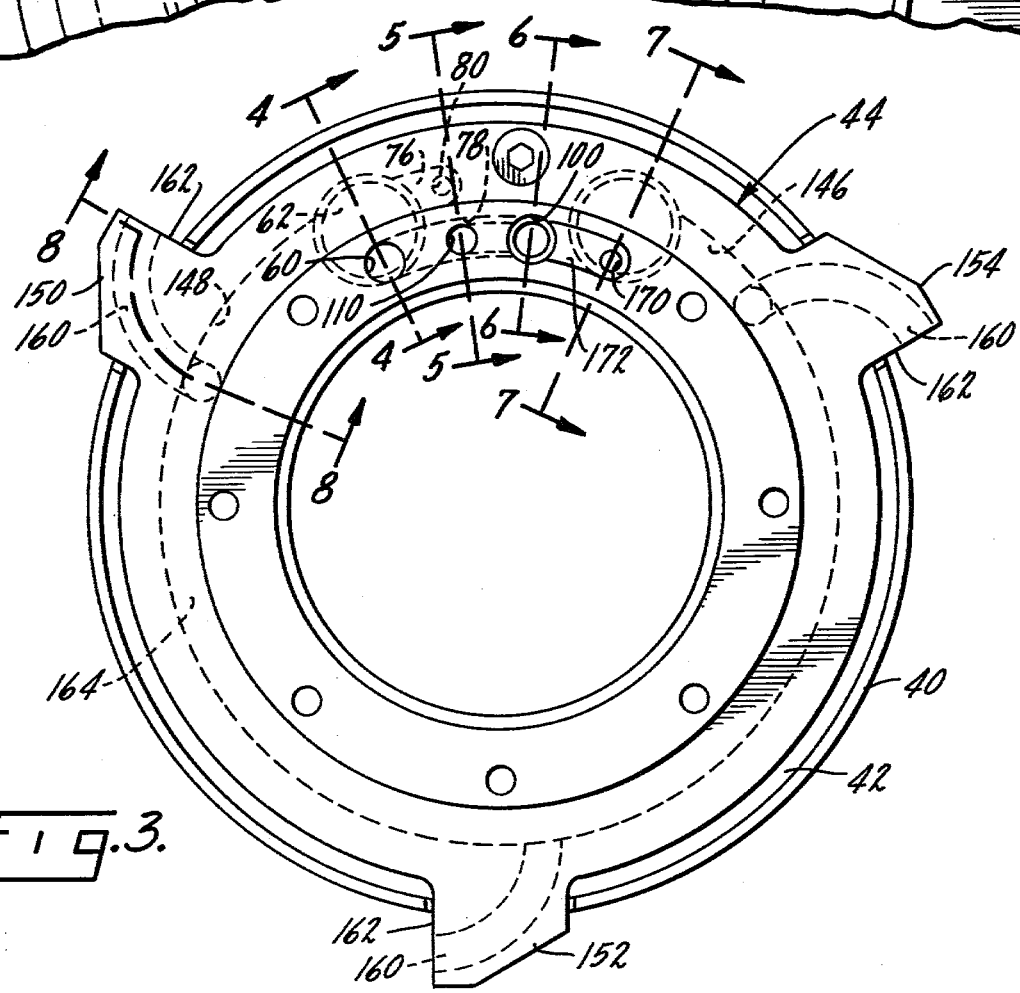

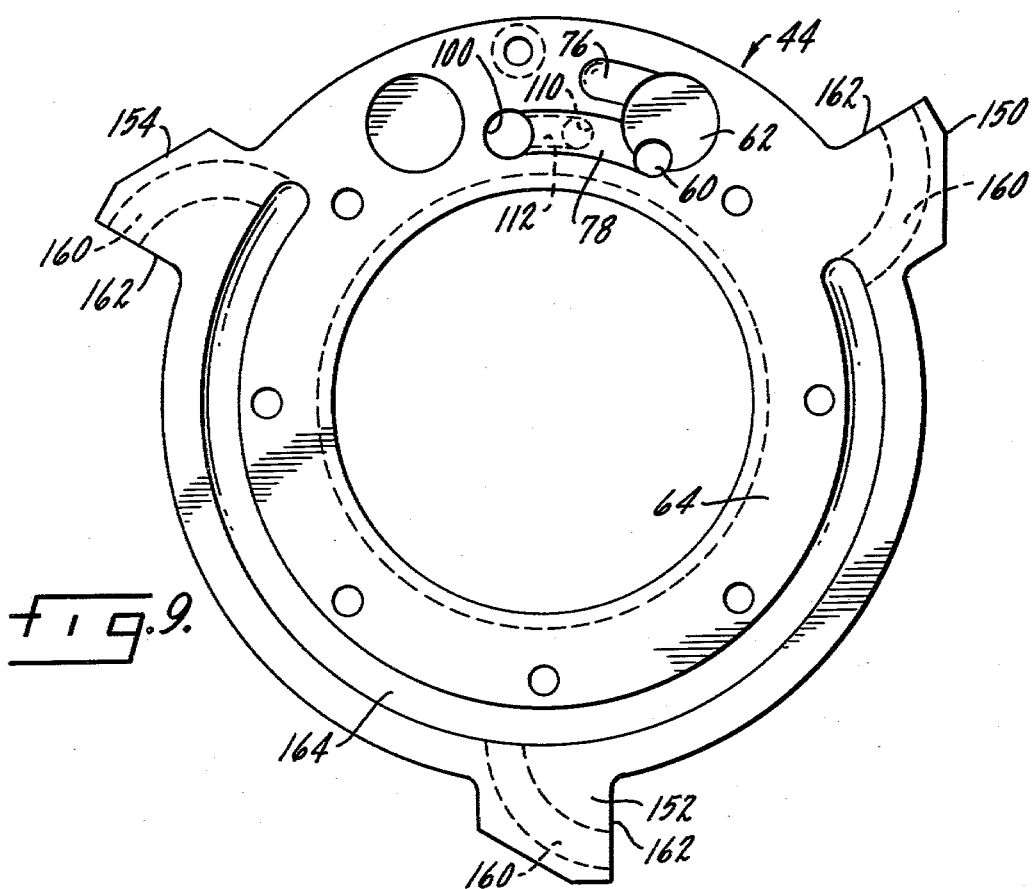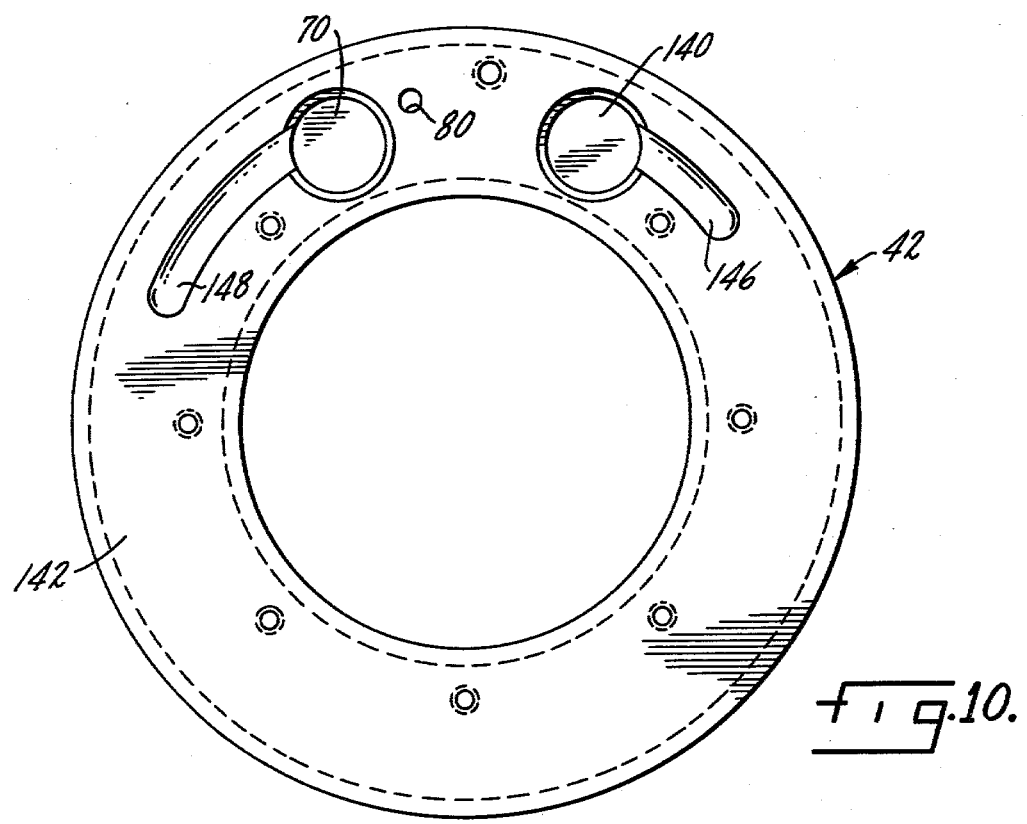

CLUTCH MECHANISM

BACKGROUND OF THE INVENTION

1. Field of the Invention

The present invention relates to means to control a drive mechanism including a clutch and adapted to act in response to the heat in a prime mover such as a vehicle engine and to control drive of a vehicle accessory, such as a fan mechanism.

2. Prior Art

The problem of controlling heat dissipation devices in connection with a vehicle engine or prime mover so as to keep the prime mover below a predetermined maximum temperature, and at the same time minimizing horse power losses due to operation of the heat dissipation device has resulted in a number of solutions. Prior approaches include those disclosed in U.S. Pat. Nos. 3,804,219 and 3,848,622 of common assignee which show a structure utilizing a separate pressure supply source to provide a temperature responsive and continuously modulated actuation of a clutch mechanism to drive a vehicle fan, the fan speed thus being variations in temperature conditions by controlling continuously the actuating pressure. Other devices known in the art, provide simple on-off devices, acting in response to temperature to actuate a switch, and for shutters in connection with the heat exchange device which may open or close in response to temperature.

SUMMARY OF THE INVENTION

The present invention provides a fluid actuated mechanism to control engagement of the drive to a vehicle fan, for example, in response to temperature which is greatly simplified from previous known solutions providing a variable drive to the fan, for example, in response to temperature. The present invention has a simplified fluid circuit which is connected to the engine oil supply line for the vehicle engine. The fluid circuit includes an orifice operative to insure proper pressure level to actuate the friction clutch within the drive mechanism, and further, utilizes unique valve mechanism for operating in response to prime mover temperature which will alternate the supply of engine oil pressure to one of two fluid passages to the mechanism whereby alternatively one of the passages to the mechanism acts as a return line and alternatively one acts as a pressure supply line. Thus only two passages are required to provide for return of fluid from the device, for supply of lubricating fluid to the rotating parts of the device, and to supply the pressure to actuate the clutch in the drive mechanism. Further, a greatly simplified structure is provided in that the output or driven member of the device comprises a rotatable housing forming a fluid sump and at the same time defining a clutch surface on the interior thereof adapted to be engaged by a clutch drum contained within the housing.

BRIEF DESCRIPTION OF THE DRAWINGS

FIG. 1 is a cross-sectional view through a drive mechanism embodying the principles of the present invention;

FIG. 2 is an end view of the drive mechanism;

FIG. 3 is an end view of the collector ring member of the assembly;

FIG. 4 is a sectional view taken along lines 4—4 of FIG. 3;

FIG. 5 is a sectional view taken along lines 5—5 of FIG. 3;

FIG. 6 is a sectional view taken along lines 6—6 of FIG. 3;

FIG. 7 is a sectional view taken along lines 7—7 of FIG. 3;

FIG. 8 is a sectional view taken along lines 8—8 of FIG. 3;

FIG. 9 is a sectional view taken along the lines 9—9 of FIG. 4; and

FIG. 10 is a sectional view taken along lines 10—10 of FIG. 4.

DETAILED DESCRIPTION OF THE PREFERRED EMBODIMENT

Referring to FIG. 1 a drive mechanism 10 is illustrated which is operative to drivingly connect a rotatable input member 12 and a rotatable output member or hub 14. As disclosed herein, mechanism 10 is particularly suitable to drive a vehicle accessory such as a cooling fan, and in such construction hub 14 is connected to the fan to drive same.

The hub 14 is connected to a flange member 16 which together with a cover 18 secured thereto define a driven housing having an interior clutch chamber 20 which is adapted to act as a fluid sump for the device. Within the chamber 20 is also a clutch drum 22 which is partly conical and is drivingly connected to the hub 12 by splines at 24. The drum 22 has a conical outer portion 26 which has a friction lining 28 mounted thereon. The clutch disc 22 is adapted to be moved into engagement with a conical surface 30 formed in the housing. A wave spring 32 is secured on hub 12 by snap ring 34 and acts as a return spring for clutch disc 22.

As described above, input member 12, output hub 14 and clutch drum 22 are rotatable parts within the fan clutch assembly. As will be apparent, when the fan is to be driven by hub 14, the clutch drum 22 will be engaged to connect input member 12 and hub 14 together for rotation. Interior of the members 16 and 18 are stationary actuating parts for the clutch mechanism 10. The stationary assembly includes a sheet metal piston member 40, an annular reaction member 42, a collector ring member 44, and a port block 46. The members 42, 44 and 46 are secured together for example by bolts 48. These parts are held stationary by a torque arm 46 as viewed in FIG. 2 which may be connected to the vehicle engine to prevent rotation of parts 40, 42, 44 and 48.

In general the operation of the device is to provide for supply of fluid pressure to engage the clutch from the engine oil supply of an engine, and return of the fluid, and in addition to provide a lubrication circuit when the clutch is not engaged. To accomplish this end there is provided a control system which is, for example, that which is illustrated in copending application Ser. No. 791,370, filed Apr. 27, 1977, now U.S. Pat. No. 4,094,393, issued June 13, 1978, of common assignee, and now U.S. Pat. No. 4,094,393. In that application, the control system is shown as operating a disc clutch unit of different construction. However, the control system operates when the engine is hot, to supply fluid pressure to the clutch to engage same, and when the engine cools the clutch is disengaged and lubricating fluid is supplied as will be later explained. The aforementioned copending application fully describes the circuitry for the control system including a thermally responsive valve and the description of that application is incorporated herein by reference.

The circuitry to supply fluid pressure to and from clutch mechanism 10 incorporates passages which are illustrated in various of the views and therefore specific references to figure numbers will not be given, however the passages are primarily shown in FIGS. 2, 3, 9, and 10. Provided in the port block 46, are a pair of fluid passages 50 and 52. Passage 50 is generally the oil inlet and passage 52 is the oil outlet when the clutch is engaged. Passage 52 is the oil inlet when the clutch is not engaged and lubricating fluid is to be supplied. Passage 50 as viewed in FIG. 4 has a connecting axial passage 54 to a face 56 on the port block which meets with a face 58 on collector ring 44. In fluid communication with passage 54 is an axial passage 60 through collector ring 44 which opens to an enlarged chamber 62 in a face 64 on the opposite side of the collector ring, in which is mounted a one-way valve mechanism 66. The valve 66 is of identical construction to that shown in U.S. Pat. No. 4,094,393 and therefore a detailed description is not given. However the valve is so constructed that when fluid flows from the area of face 58 toward face 64, valve 66 will close and block therethrough.

In reaction member 42 as viewed in FIG. 10 there is a bore 70 which receives large diameter 72 of valve 66. The operation of the valve 66 is to at times let fluid pass therethrough into suitable porting in member 42 and at times to block such flow. The enlarged chamber 62 as viewed in FIG. 9 has an ear or slot 76 in fluid communication therewith, and a longer slot 78 in fluid communication therewith. Both slots 78 and 76 are formed in face 64 of collector ring 44. Slot 76 is provided to conduct fluid from port 50 to actuate the piston 40. Slot 76 as shown in FIG. 5 is in fluid communication with a port 80 extending through reaction member 42 and connecting with a pressure chamber 82 defined by piston 40 and member 42. Thus fluid pressure supplied through inlet port 50 will be conducted to chamber 82 and move piston 40 to the left, which by the medium of a roller thrust bearing 84 will move the clutch drum 22 to the left to engage friction material 28 with clutch surface 30 to lock members 12 and 14 together for rotation. Provided in fluid communication with the slot 78 in face 64 is a bore 100 having a relief valve spool 102 mounted therein and urged to the left by spring 104 as viewed in FIG. 6. The bore or port 100 is also illustrated in dotted lines in FIG. 5. Also illustrated in the same FIGURE is a partially drilled passage 110 which has a radial branch passage 112 communicating therewith and connected to the bore 100. The passage 110 is connected to the radially inwardly extending passage 114 which connects to a passage 115 which connects to a radial passage 116 which in turn connects to an axial passage 118 in member 14. Passage 118 supplies lubricating fluid which can flow out radial passages 120 in member 14 to lubricate the various parts of the clutch.

As will be apparent, when relief valve spool 102 is in its position as illustrated in FIG. 6, fluid flow cannot be communicated by means of the groove 78 and the bore 100 into bore 112 and passage 110 to relieve pressure. Only when the spool 102 moves a sufficient amount to the right will the passage 112 be uncovered to relieve pressure. Thus the spool 102 can serve as a pressure regulator valve to maintain a predetermined pressure in clutching actuating chamber 82 depending upon the size of spring 104.

As viewed in FIG. 10 two enlarged chambers 70 and 140 are provided in face 142 of member 42. Both of the chambers 70 and 140 receive a large diameter end of check valves as described above, the chamber 70 receiving check valve 66 and chamber 140 receiving a check valve 143 as viewed in FIG. 7.

Chamber 140 has a circumferentially extending ear or slot 146 in the face and chamber 70 has a circumferential slot 148. The purpose of slots 146 and 148 is to pick up fluid collected by collector ring 44 as will be described and conducted same to chambers 70 and 140. As illustrated in FIG. 9 collector ring 44 has three ears 150, 152 and 154 which each have a circular passage 160 therein which communicates with a radial face 162. Passages 160 communicate with a collector passage 164 in the face of the member 44. Thus as housing members 16 and 18 rotate fluid will be impinged on faces 162 and fluid will collect and be communicated to 164 in the face thereof. Fluid in slot 164 will be communicated to slot 148 and 146 in member 42, such that any fluid collected by collector ring 44 from the housing will be communicated in chamber 70 and 140 for the purposes as will be described.

When passage 50 is receiving fluid to actuate the clutch, a certain amount of this fluid by means of relief valve 102 will be conducted to the interior parts to lubricate same. Such fluid is to be collected by collector ring 44 and returned to engine from which the fluid was received. As described above, collector ring 44 serves to deliver such collected fluid to chambers 70 and 140. Fluid in chamber 70 cannot pass therethrough since the one-way check valve 66 is pressurized at this time by pressure in port 50 and return fluid will thus be blocked. However, fluid in chamber 140 will be able to flow therethrough since check valve 143 is not pressurized. Fluid will flow through valve 143 shown in FIG. 7 and communicate with an axial passage 170 extending through collector ring 44. The fluid will then be conducted to groove 172 in the face 58 thereof, and into the return pressure port 52. Fluid in the groove or passage 172 will not flow into the radially extending lube passage 114 at this time because piston 102 will be far enough to the right to block communication from passage 172 to radial passage 114. Thus the fluid from the housing chamber 20 will be returned to the pressure source.

As described above, the valve (not illustrated herewith) which is thermally responsive can operate to reverse the circuits and supply the engine lube flow into outlet port 52. Such operation is also described in the above mentioned U.S. Pat. No. 4,094,393. When fluid flow is supplied into passage 52, it will be blocked from flowing into chamber 140 by check valve 143 and be conducted through port 172 to connect with the radial passage 114. Since the inlet pressure passage 50 is not pressurized, spring 104 will return spool 102 to the left and unblock passage 172 to connect same with passage 114. Thus a source of lube pressure is now provided through passage 52 to the internal parts of the clutch to lubricate same while the clutch is not engaged but the parts are rotating. At this time fluid flow collected by collector ring 44 in passage 164 will be communicated as described above to chambers 70 from which it can flow through check valve 66 since valve 66 is not pressurized at this time and into axial passage 60 and inlet port 50 from which it will flow back to the source of flow.

Thus by means of only two passages, pressure supply, pressure return and lube functions have been provided for the clutch which is also described in the aforementioned application. Further, this is carried out in a very convenient manner by having utilizing stationary parts for the porting arrangement and having none of the porting in a rotating part which is advantageous for sealing purposes as will be apparent. As has been described, the unique mechanism for actuating the drive to a cooling fan, for example, is such that a thermally responsive control valve system must be provided, and such control valve is fully illustrated in the above mentioned copending application which has been incorporated herein by reference. It is sufficient to say that the thermal valve when the engine is too warm provides a supply of engine oil pressure to port 50, which actuates the clutch to engage the fan and cool the engine. Fluid pressure is returned from clutch 10 by reutrn port 52 as described. However, when the engine sufficiently cools so that the fan is no longer needed, the operation of the control system is to reverse the pressure supply flow such that the pressure supply is now into return port 52 which serves to lubricate during the fan off or non-drive position as is necessary and the inlet port 50 now becomes the return port. Thus, the present described invention provides a unique way of utilizing two fluid circuits to carry out the three functions of pressure supply, pressure return and pressure lubrication.

In addition to the above advantage, the present construction provides a unique and simplified way of utilizing the engine lubrication oil circuit of an engine as the pressure actuating supply for the clutch mechanism. Proper pressure is insured to actuate the clutch mechanism by use of the pressure regulator valve 100, 102, 104 in the fluid circuit to provide a buildup of pressure. Instant on and off engagement of the clutch 10, which could result in sudden changes in engine available horsepower, is prevented by use of an orifice to provide for slow engagement and disengagement of clutch 10. For the reasons pointed out above, the present invention comprises a unique and novel method of controlling and operating a friction clutch device for thermostatically responsively engaging and disengaging the clutch to drive or disconnect the drive to a cooling device.

I claim:

1. A temperature responsive drive mechanism for an engine comprising a driving member and a driven member, a friction clutch connected between said members adapted to provide a releasable coupling therebetween, a stationary actuator mechanism associated with said members and adapted to engage said clutch in response to fluid pressure, a source of fluid pressure, a pair of fluid passages connecting said drive mechanism to said source, a rotatable clutch drum having a friction surface thereon connected to said driving member, a rotatable housing defining said driven member and having said actuator mechanism and said drum mounted therein, whereby one of saidpassages will supply pressure to the actuator to engage the clutch when supplied with fluid pressure when the temperature of the engine exceeds a predetermined maximum, and the other of said passages when supplied with pressure providing lubricant supply to said drive mechanism when the engine is below a predetermined temperature, and a temperature responsive valve connected to operate such that one of said passages acts as a return fluid passage when the other of said passages is connected to said source, and said other passage acts as a return fluid passage when said one passage is connected to said source.

2. A drive mechanism as in claim 1 wherein said actuator comprises a reaction member and a sheet metal piston member, said reaction member disposed within said piston.

3. A drive mechanism as claimed in claim 1 wherein said housing defines an internal clutch surface engageable by said clutch drum.

4. A drive mechanism as claimed in claim 3 wherein said internal clutch surface is conical in configuration.

5. A drive mechanism comprising a rotatable driven housing and a rotatable driving clutch member, a friction clutch connected between said member and said housing and adapted to provide a releasable coupling therebetween, a stationary actuator mechanism adapted to engage said clutch in response to fluid pressure, a source of fluid pressure, a pair of fluid passages connecting said drive mechanism to said source, said clutch member having a friction surface thereon, said housing defining an internal clutch surface and having said actuator mechanism and clutch member contained therewithin, one of said passages adapted to supply pressure to the actuator to engage the clutch when supplied with fluid pressure and the other of said passages when supplied with pressure providing lubricant supply to said drive mechanism when the engine is below a predetermined temperature and means, including a temperature responsive valve, connected to operate such that one of said passages acts as a return fluid passage when the other of said passages is connected to a pressure source, and said other passage acts as a return fluid passage when said one passage is connected to said source.

6. A drive mechanism as in claim 5 wherein said actuator comprises a reaction member and a sheet metal piston member, said reaction member disposed within said piston.

7. A drive mechanism as claimed in claim 5 wherein said internal clutch surface is conical and said clutch member has an external complementary clutch surface thereon.

8. A drive mechanism as claimed in claim 7 wherein said clutch member is movable axially to engage said internal clutch surface.

* * * * *